(12) United States Patent
Cho et al.

(10) Patent No.: US 7,864,404 B2
(45) Date of Patent: Jan. 4, 2011

(54) LIGHT GUIDE UNIT AND DISPLAY DEVICE HAVING THE SAME

(75) Inventors: Don-Chan Cho, Seongnam-si (KR); Hyun-Min Cho, Seoul (KR); Seul Lee, Seoul (KR); Jae-Byung Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/535,131

(22) Filed: Aug. 4, 2009

(65) Prior Publication Data
US 2010/0225993 A1    Sep. 9, 2010

(30) Foreign Application Priority Data
Mar. 6, 2009    (KR) ........................ 2009-0019276

(51) Int. Cl.
*G02B 26/00*    (2006.01)
(52) U.S. Cl. ..................................... 359/292
(58) Field of Classification Search .......... 359/292, 359/291, 295, 298, 308, 320, 224, 233, 237, 359/454, 455, 459; 385/901; 362/26, 97.3, 362/244, 246, 248, 341–350
See application file for complete search history.

(56) References Cited

U.S. PATENT DOCUMENTS

| | | | |
|---|---|---|---|
| 7,581,867 B2 * | 9/2009 | Lee et al. | 362/620 |
| 7,616,368 B2 * | 11/2009 | Hagood, IV | 359/290 |
| 2005/0270798 A1 * | 12/2005 | Lee et al. | 362/607 |

* cited by examiner

*Primary Examiner*—Timothy J Thompson
*Assistant Examiner*—Tuyen Q Tra
(74) *Attorney, Agent, or Firm*—Cantor Colburn LLP

(57) ABSTRACT

A light guide unit includes a light guide plate and a plurality of light-exiting protrusions. The light guide plate includes a light-entering surface, an upper surface connected to the light-entering surface and a lower surface facing the upper surface. The light-exiting protrusions protrude from the upper surface of the light guide plate to have a cylindrical shape in which a cross-section size thereof increases in a direction away from the upper surface of the light guide plate, the light-exiting protrusions being disposed in a light control area which is turned on or off by a microelectromechanical system shutter. Light guided by the light guide unit to the light control area exits through the light-exiting protrusions.

20 Claims, 9 Drawing Sheets

LIGHT GUIDE UNIT AND DISPLAY DEVICE HAVING THE SAME

This application claims priority to Korean Patent Application No. 2009-19276, filed on Mar. 6, 2009 and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a light guide unit and a display device including the light guide unit. More particularly, exemplary embodiments of the invention relate to a light guide unit controlling a backlight of a display device and a display device including the light guide unit.

2. Description of the Related Art

Generally, display devices are devices capable of allowing the viewing and editing of contents inputted by using an input device. For example, the display devices may include cathode ray tube ("CRT") devices, liquid crystal display ("LCD") devices, plasma display panel ("PDP") devices, field emission display ("FED") device, etc.

Research for employing new modes in the display field has been expanded. For example, organic light-emitting diode ("OLED") displays have been partially commercialized, which are recognized as next-generation devices of LCD devices, PDP devices and so on. Moreover, interest in flexible display devices is increasing, which are being rediscovered for their necessity and value. In addition, interest in display devices based on a microelectromechanical system ("MEMS") having benefits such as high light-use efficiency and high-speed switching characteristics is increasing.

A display device based on the MEMS may be classified as a reflective-type display device, a transmissive-type display device, etc. A Digital Micro Shutter™ (DMS™, trademark of Pixtronix, Inc., U.S.A.) display device has been receiving attention, which is a display device based on the MEMS realized by using the LCD process. The DMS™ display device includes a MEMS shutter which moves in a horizontal direction and a slit substrate in which an opening portion is formed in a predetermined area to control the MEMS shutter.

The display device based on the MEMS, such as the DMS™ display device, employs a light-recycling structure, so that light-use efficiency may be enhanced. However, loss of light is generated during a light-recycling process, so that there may be limits to enhancing the light-use efficiency. In addition, the light-recycling structure is complicated, so that manufacturing costs may be increased.

BRIEF SUMMARY OF THE INVENTION

Exemplary embodiments of the invention provide a light guide unit capable of enhancing light-use efficiency.

Exemplary embodiments of the invention provide a display device having the above-mentioned light guide unit, which is based on a microelectromechanical system ("MEMS").

In one exemplary embodiment, a light guide unit includes a light guide plate and a plurality of light-exiting protrusions. The light guide plate includes a light-entering surface, an upper surface connected to the light-entering surface and a lower surface facing the upper surface. The light-exiting protrusions protrude from the upper surface of the light guide plate to have a cylindrical shape in which a cross-section size thereof increases away from the upper surface of the light guide plate, the light-exiting protrusions being disposed in a light control area which is turned on or off by a microelectromechanical system shutter. Light guided by the light guide unit to the light control area exits through the light-exiting protrusions.

In an exemplary embodiment, a display device includes a display panel, a light guide plate and a plurality of light-exiting protrusions. The display panel includes a first substrate and a second substrate. The second substrate includes an upper substrate, a switching element, a light control area defined at a lower surface of the upper substrate and a microelectromechanical system shutter. The microelectromechanical system shutter is shifted by the switching element in a horizontal direction within the light control area to turn on or turn off the light control area. The light guide plate faces a lower surface of the first substrate. The light-exiting protrusions are disposed between the lower surface of the first substrate and an upper surface of the light guide plate in correspondence with the light control area. Light-guided by the light guide plate is exited through the light-exiting protrusions toward the light control area.

In an exemplary embodiment of the invention, the light-exiting protrusions may be protruded from an upper surface of the light guide plate, such that the light guide plate is a single unitary indivisible member including the light-exiting protrusions. Alternatively, the light-exiting protrusions may be protruded from a lower surface of the first substrate, such that the first substrate is a single unitary indivisible member including the light-exiting protrusions. Here, the first substrate may include a lower substrate and a light-blocking layer. The lower substrate may face the upper substrate. The light-blocking layer may be disposed on an upper surface of the lower substrate to block light. A plurality of first slits, which transmits light by a unit area corresponding to the light control area, may be formed in the light-blocking layer. The light-exiting protrusion may have a cylindrical shape in which a cross-section size thereof increases in a direction away from the light guide plate. The light-exiting protrusions may be disposed to correspond to and be aligned with the first slit.

In an exemplary embodiment, the light-exiting protrusion has an inverted conical shape. In another exemplary embodiment, the light-exiting protrusion has a bar shape longitudinally extended in a length direction of the first slit. The display panel may further include an insulation fluid disposed between the first substrate and the second substrate. The light guided by the light guide plate may be fully reflected at an upper surface and a lower surface of the light guide plate, except for area of the upper surface where the light-exiting protrusions are disposed.

In an exemplary embodiment of the invention, a light-reflecting layer for recycling light in a display panel may be omitted, so that the structure of the display device may be simplified. Moreover, light is provided to the light control area through only the light-exiting protrusions, and thus light-use efficiency may be enhanced so that the display quality of the display device may be enhanced.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
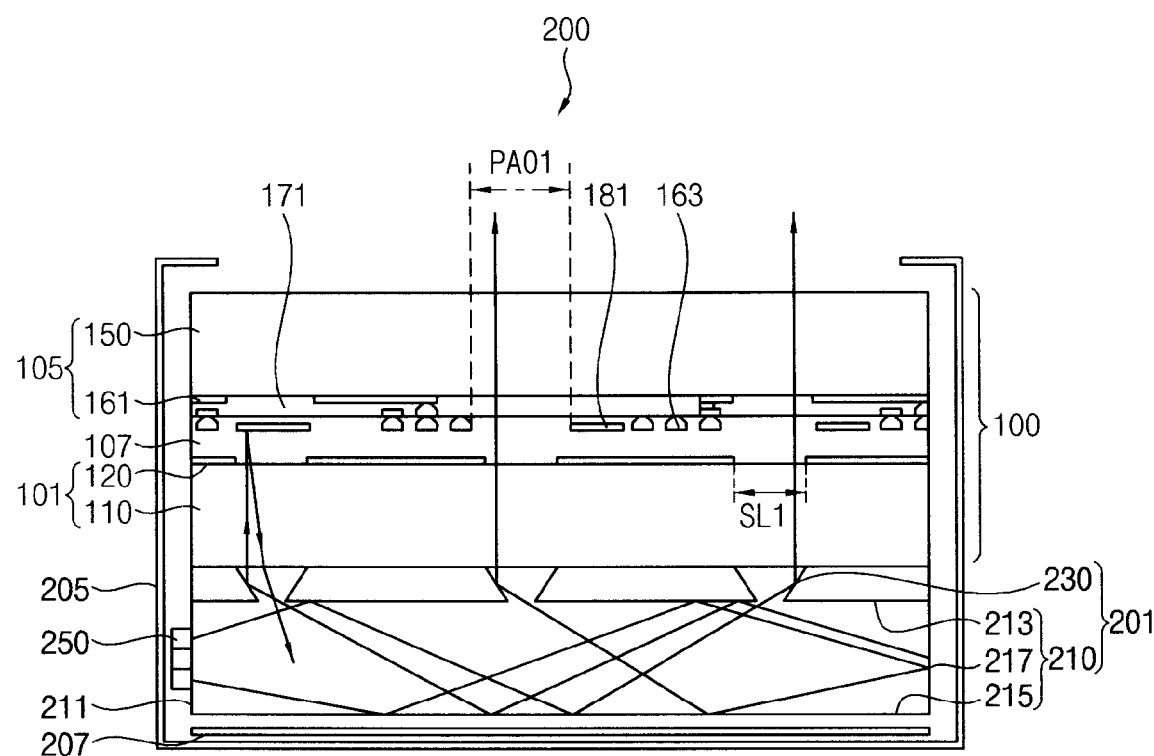
FIG. 1 is a cross-sectional view illustrating an exemplary embodiment of a display device according to the invention.

The invention is described more fully hereinafter with reference to the accompanying drawings, in which exemplary embodiments are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on" or "connected to" another element or layer, it can be directly on or connected the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Hereinafter, exemplary embodiments will be explained in detail with reference to the accompanying drawings.

Figure 2:
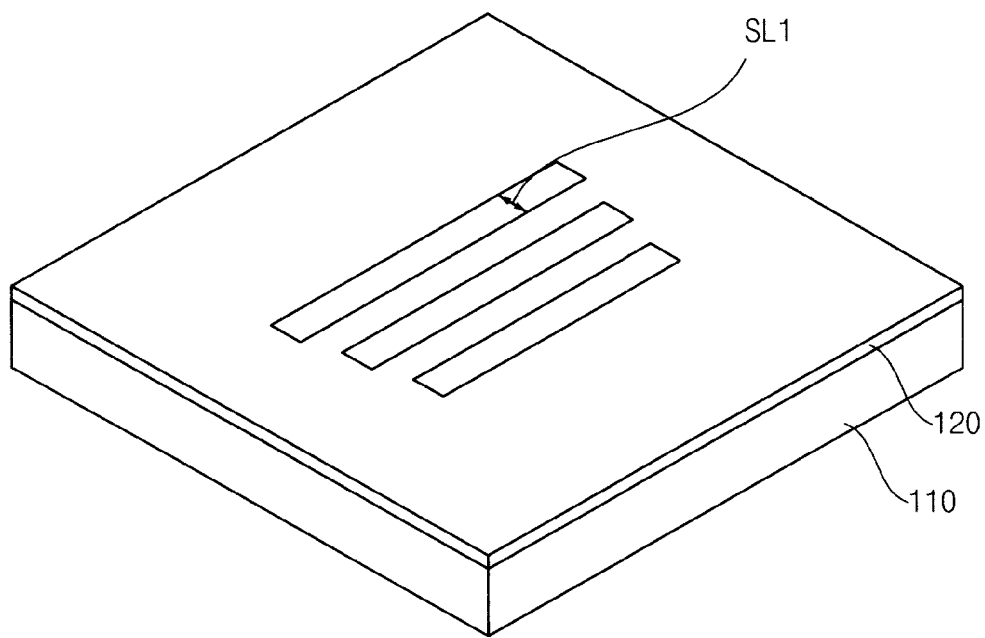
FIG. 2 is a perspective view illustrating an exemplary embodiment of the first substrate of FIG. 1.

FIG. 1 is a cross-sectional view illustrating an exemplary embodiment of a display device. FIG. 2 is a perspective view illustrating an exemplary embodiment of the first substrate of FIG. 1.

Referring to FIG. 1, a display device 200 of the illustrated embodiment includes a display panel 100, a light guide unit 201 and a light source 250. The display panel 100 may be a display element which uses a microelectromechanical system ("MEMS"). The display panel 100 includes a first substrate 101 and a second substrate 105.

Referring to FIGS. 1 and 2, the first substrate 101 includes a lower substrate 110 and a light-blocking layer 120. The lower substrate 110 may include a glass material and/or a plastic material. A plurality of a unit area, for example, pixel areas may be defined on an upper surface of the lower substrate 110.

The light-blocking layer 120 is disposed on an upper surface of the lower substrate 110. The light-blocking layer 120 blocks or absorbs light incident through the second substrate 105, so that reduction of a contrast ratio of the display panel 100 may be reduced or effectively prevented due to unnecessarily reflected light. The light-blocking layer 120 may include a light-absorbing layer, for example, a black chrome layer. The light-blocking layer 120 may be disposed in a single layer.

A plurality of a first slit SL1 is disposed extending completely through the light-blocking layer 120 in a direction perpendicular to the upper surface of the lower substrate 110. The upper surface of the lower substrate 110 is exposed by the first slits SL1. The first slit SL1 is an enclosed opening penetrating the light-blocking layer 120 where the light-blocking layer 120 solely defines the enclosed first slit SL1. The first slits SL1 are disposed in one of the unit area. In the illustrated embodiment, the first slit SL1 is disposed longitudinally extended in a straight line shape. Three first slits SL1 are disposed in the unit area in parallel with each other. Light, which is emitted from the light source 250 via the light guide unit 201, is provided to the second substrate 105 through the first slit SL1.

The first substrate 101 may further include a first insulation layer (not shown). The first insulation layer may insulate the light-blocking layer 120 by covering (e.g., overlapping) the light-blocking layer 120, and may physically and chemically protect the light-blocking layer 120.

In the illustrated embodiment, a light-reflecting layer is not disposed between an upper surface of the lower substrate 110 and the light-blocking layer 120. In a conventional display device, the light-reflecting layer may be disposed in a plurality of layers such as an aluminum layer, a silica layer, a dioxide titanium layer, etc. The light-reflecting layer recycles light by reflecting the remaining light that is not incident to the first slit SL1, so that light-use efficiency may be enhanced. However, according to technology and structural features of the illustrated embodiment, light-use efficiency may be enhanced without the light-reflecting layer. A detailed explanation of the above subject will be described below.

Figure 3:
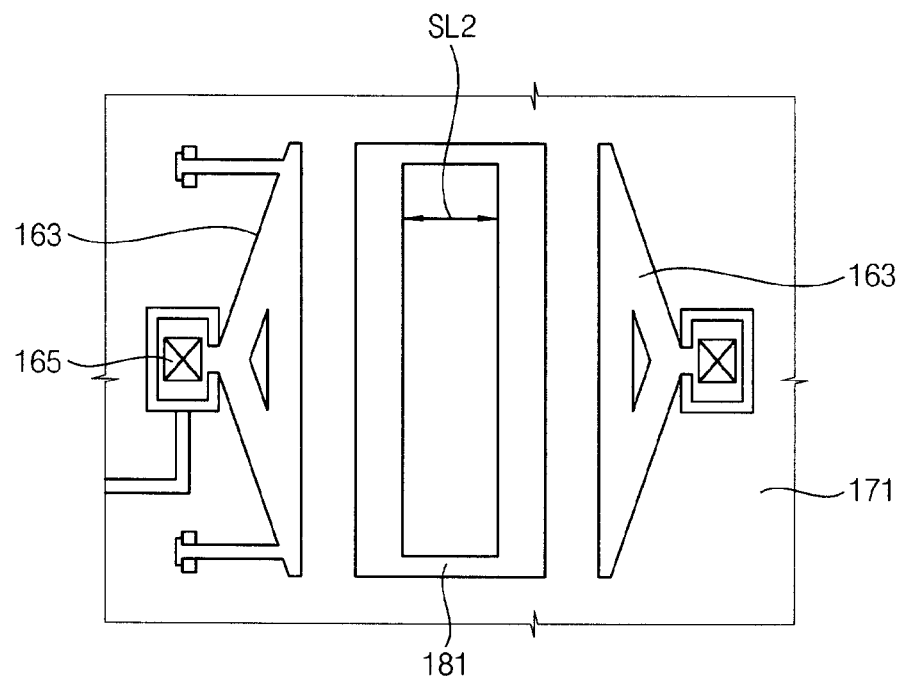
FIG. 3 is a plan view illustrating an exemplary embodiment of the second substrate of FIG. 1.

FIG. 3 is a plan view illustrating an exemplary embodiment of the second substrate 105 of FIG. 1.

Referring to FIGS. 1 and 3, the second substrate 105 may include an upper substrate 150, a switching element 161, a second insulation layer 171 and a MEMS shutter 181.

The upper substrate 150 is disposed to face the upper surface of the lower substrate 110. The upper substrate 150 may include glass material and/or plastic material. A plurality of a light control area PA01 corresponding to the unit areas, respectively, may be defined on a lower surface of the upper substrate 150. The upper substrate 150 may include a plurality of circuit wirings, such as gate lines and data lines. The gate lines may be disposed on a peripheral area between adjacent light control areas PA01, to be longitudinally extended along a first direction. The data lines may be insulated from the gate lines, and may be disposed to be longitudinally extended along a second direction crossing the gate lines.

The upper substrate 150 may further include a driving part (not shown). In one exemplary embodiment, the driving part is mounted on an edge portion of the upper substrate 150, such as in a chip type. In an alternative exemplary embodiment, the driving part is integrated on the upper substrate 150. In another alternatively exemplary embodiment, the driving part may be mounted on a printed circuit board ("PCB") to be connected to the upper substrate 150.

The switching element 161 may be disposed in the peripheral area between adjacent light control areas PA01. The switching element 161 may include a gate electrode connected to a gate line, a source electrode connected to a data line and a drain electrode facing the source electrode. The gate line, the data line and the switching element 161 may be collectively formed similar t a thin-film transistor ("TFT") substrate which is used in a driving substrate in a liquid crystal display ("LCD") device of an active matrix type.

The second insulation layer 171 covers (e.g., overlaps) the circuit wiring and the switching element 161. A contact hole 165 exposing a portion of the drain electrode of the switching element 161 is disposed extended completely through the second insulation layer 171.

Two of a control electrode 163 are disposed on the second insulation layer 171 to face each other with respect to the MEMS shutter 181, in a plan view of the second substrate 105, in accordance with an edge portion of the light control area PA01. The control electrode 163 is extended to the contact hole 165 as shown in FIG. 3, so that the control electrode 163 may be electrically connected to the switching element 161, such as through a conductive substance connected to the drain electrode.

The MEMS shutter 181 is disposed between the control electrodes 163 in a plan view of the second substrate 105. A plurality of an opening, such as having a slit shape, is disposed extended through the MEMS shutter 181 in a direction perpendicular to the lower surface of the upper substrate 150. The opening may be defined as a second slit SL2. A planar area of the first slit SL1 in the light blocking layer 120 may be smaller than a planar area of the second slit SL2 in the MEMS shutter 181 by about 95% to about 98%. The second slit SL2 is an enclosed opening penetrating the MEMS shutter 181 where the MEMS shutter 181 solely defines the enclosed second slit SL2.

In operating the display device 200, positive electricity or negative electricity may be applied to the MEMS shutter 181. When a scan signal is applied to the gate electrode through the gate line, and a data signal is applied to the source electrode through the data line, the data signal is applied to the control electrode 163. Thus, due to the static electricity with the control electrode 163, the MEMS shutter 181 shifts in a left direction and a right direction, that is, in a horizontal direction in parallel with the second substrate 105. When the data signal is a turn-on signal, the MEMS shutter 181 is moved in the horizontal direction to correspond and align the first slit SL1 of the light blocking layer 120 and the second slit SL2 of the MEMS shutter 181 with each other. When the data signal is a turn-off signal, the MEMS shutter 181 is shifted in a horizontal direction to close (e.g., overlap) the first slit SL1 of the light blocking layer 120, such that the second slit SL2 is not aligned with the first slit SL1.

The display panel 100 may further include an insulation fluid 107. In one exemplary embodiment, the insulation fluid 107, such as oil, is disposed between the first substrate 101 and the second substrate 105.

Figure 4:
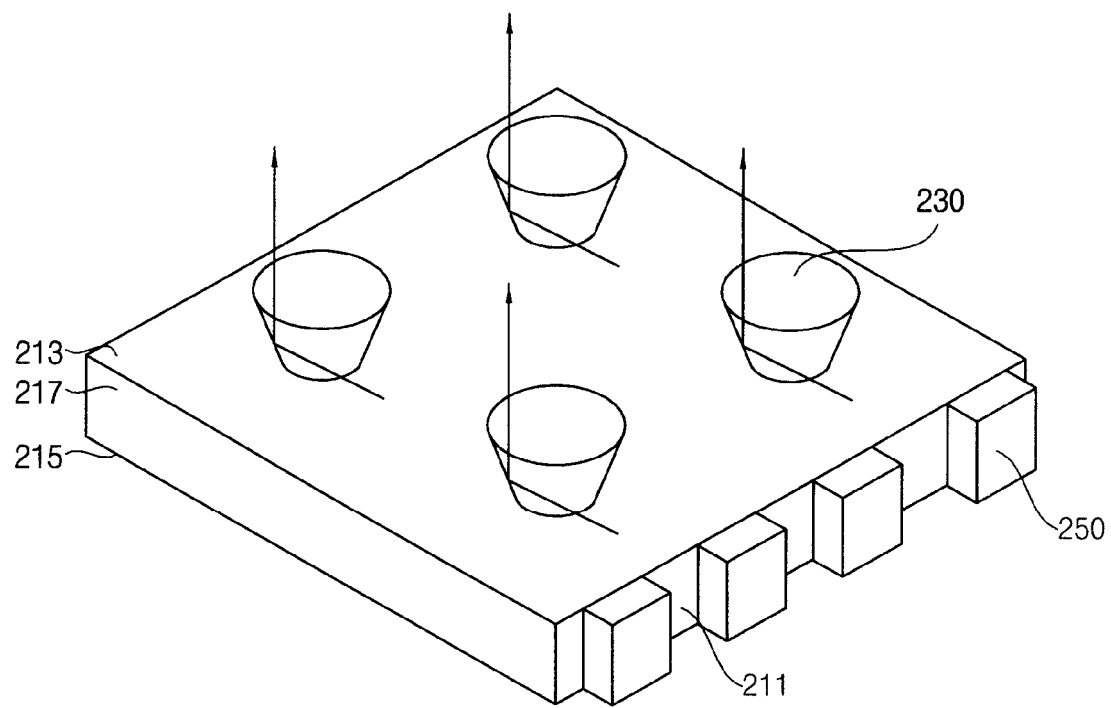
FIG. 4 is a perspective view illustrating an exemplary embodiment the light guide unit of FIG. 1.

FIG. 4 is a perspective view illustrating an exemplary embodiment of the light guide unit 201 of FIG. 1.

Referring to FIGS. 1 and 4, the light-guiding unit 201 of the illustrated embodiment guides light emitted from the light source 250 to provide the display panel 100 with the light. The light source 250 may include a light-emitting diode ("LED"). Alternatively, the light source 250 may include a cold cathode fluorescent lamp ("CCFL"). In the illustrated embodiment, the light source 250 may include a red LED, a green LED and a blue LED.

The light guide unit 201 includes a light guide plate ("LGP") 210 and a plurality of a light-exiting protrusion 230. The LGP 210 including the light-exiting protrusions 230 may be a single unitary indivisible member, as shown in FIG. 1.

The LGP 210 is disposed below the first substrate 101 opposing a viewing side of the display device 200. The LGP 210 ha a plate shape and includes a light-entering surface 21, an upper surface 213 connected to the light-entering surface 211, a lower surface 215 connected to the light-entering surface 211 to face the upper surface 213, and an opposite surface 217 facing the light-entering surface 211.

The light source 250 is disposed at the light-entering surface 211, which is a first side of the LGP 210. The LGP 210 diffuses light emitted from the light source 250, such that the luminance of light provided to the display panel 100 is made substantially uniform. As shown in FIG. 1, light which is emitted from the LED 250, to be incident to the light-entering surface 211 of the LGP 210, may be fully reflected at each of the upper surface 213 of the LGP 210, the lower surface 215 of the LGP 210 and the opposite surface 217. In order to fully reflect the light, the upper surface 213 of the LGP 210, the lower surface 215 of the LGP 210 and the opposite surface 217 may be planarized, such as to not have an uneven pattern.

The LGP 210 may include a polymer resin having high light transmissivity, heat-resistant properties, chemical-resistant properties and mechanical strength, etc. Exemplary embodiments of the polymer resin may include polymethylmethacrylate, polyamide, polyimide, polypropylene, polyurethane, for example, but are not limited thereto.

The display device 200 may further include a reflective sheet 207. The reflective sheet 207 is disposed below the LGP 210 to reflect a portion of light leaked through a lower surface 215 of the LGP 210. In an exemplary embodiment, the reflective sheet 207 may be disposed overlapping a whole of the lower surface 215 of the LGP 210.

Figure 5:
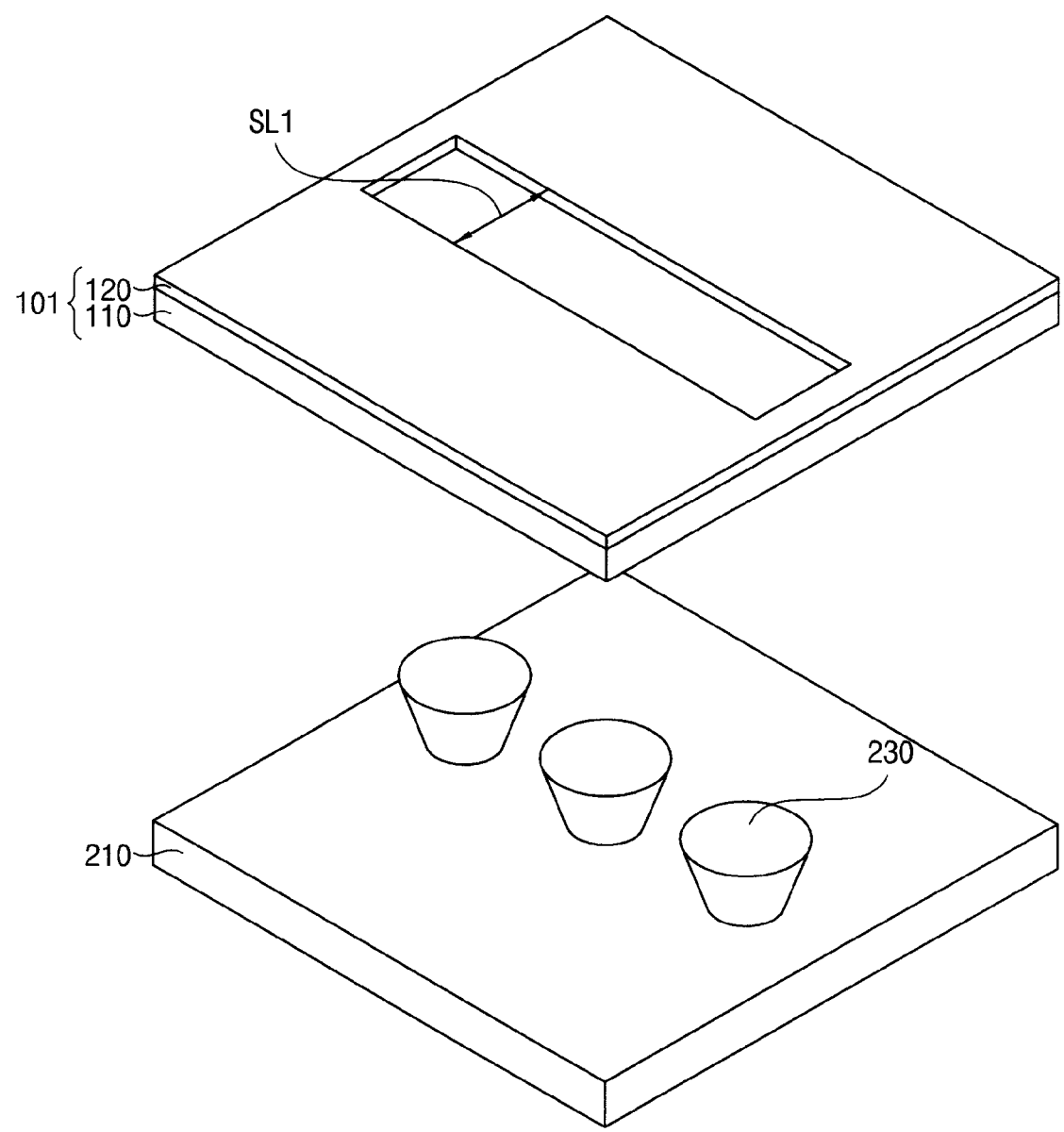
FIG. 5 is a perspective view illustrating an exemplary embodiment of an arrangement of the first substrate and the light guide unit.

FIG. 5 is a perspective view illustrating an exemplary embodiment of an arrangement of the first substrate 101 and the light guide unit 201.

Referring to FIGS. 1, 4 and 5, the light-exiting protrusions 230 are integrated in the upper surface 213 of the LGP 210, and the LGP 210 is a single unitary indivisible member including the light-exiting protrusions 230. The light-exiting protrusions 230 are arranged to correspond and be aligned with the first slit SL1 disposed extending through the light-blocking layer 120. In the illustrated embodiment, a plurality of the light-exiting protrusion 230 may correspond to one of the first slit SL1.

The light-exiting protrusion 230 may have a cylindrical or cone shape in which a cross-section size thereof taken parallel to the upper surface 213 of the LGP 210, increases in a direction away from the upper surface 213 of the LGP 210. In the illustrated embodiment, the light-exiting protrusion 230 has an inverted conical shape. The upper (distal) surface of the light-exiting protrusion 230 having the inverted conical shape, is planarized, and a surface of the light-exiting protrusion 230 contacting and coplanar with the upper surface 213 of the LGP 210, is defined as a lower surface. Thus, a side surface of the light-exiting protrusion 230, which connects the upper surface of the light-exiting protrusion 230 and the lower surface of the light-exiting protrusion 230, may be inclined with respect to the upper surface 213 of the LGP 210.

In the illustrated embodiment, a full reflection is repeated within the LGP 210, so that light confined within the interior of the LGP 210 is incident to the light-exiting protrusion 230. The light incident to the light-exiting protrusion 230 is reflected at a side surface of the light-exiting protrusion 230, as shown in FIGS. 1 and 4, to ultimately exit the upper surface of the light-exiting protrusion 230 and travel toward the first slit SL1 of the light blocking layer 120. The upper surface of the light-exiting protrusion 230 contacts a lower surface of the lower substrate 110, and light that exits from the light-exiting protrusion 230 passes through the first slit SL1 and into an internal area of the lower substrate 110, as illustrated in FIG. 1.

The light-exiting protrusion 230, the first slit SL1 of the light blocking layer 120 and the second slit SL2 of the MEMS shutter 181 may be aligned, such as when the light control area is turned on, to allow light exiting from the upper (distal) surface of the light-exiting protrusion 230, to pass through the first slit SL1 and the second slit SL2, to ultimately pass through the upper substrate 150, as shown by the arrows in FIG. 1.

Figure 6A:
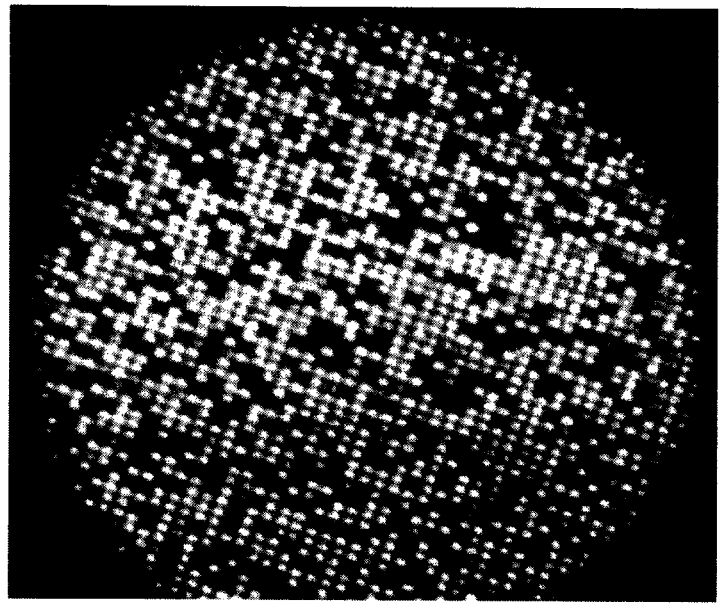
FIG. 6A is a microscope image showing an exemplary embodiment of a front surface of the light guide unit of FIG. 4.
Figure 6B:
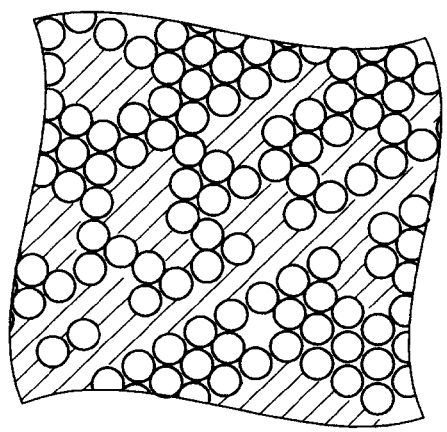
FIG. 6B is a plan view schematically representing the microscope image of FIG. 6A.

FIG. 6A is a microscope image showing a front surface of the light guide unit 201 of FIG. 4, and FIG. 6B is a plan view schematically representing the microscope image of FIG. 6A.

Referring to FIGS. 4 to 6B, it is recognized that an area in which the light-exiting protrusions 230 are disposed is bright and another area in which the light-exiting protrusions 230 are not disposed is dark. Thus, light is exited through only the light-exiting protrusions 230, and light is reflected by an inner surface of the upper surface 213 of the LGP 210, except for areas where the light-exiting protrusions 230 are disposed. Therefore, almost no light is incident to the light-blocking layer 120 except for areas where the first slit SL1 is disposed. Accordingly, as described above, leaking of light may be reduced or effectively prevented even though an additional light-reflecting layer is not disposed on the first substrate 101.

In contrast to the illustrated exemplary embodiment, when the light-reflecting layer is disposed, light is repeatedly passed through the lower substrate 110 and the LGP 210, so that light loss may be generated. However, according to the illustrated exemplary embodiment, a process of recycling light is limited within the interior of the LGP 210, and light is provided to the first slit SL1 of the blocking layer 120 through only the light-exiting protrusion 230. Thus, light loss may be reduced to enhance light-use efficiency, so that the luminance of the display device 200 may be enhanced.

FIGS. 7A to 7D are cross-sectional views illustrating an exemplary embodiment of a manufacturing process of the light guide unit 201 of FIG. 4.

Referring to FIGS. 7A, 7B, 7C and 7D, the light-exiting protrusions 230 may be formed on an upper surface 213 of the LGP 210, such as through a photolithography process. Alternatively, the light-exiting protrusions 230 may be formed on the upper surface 213 of the LGP 210 through a printing process.

Figure 7A:
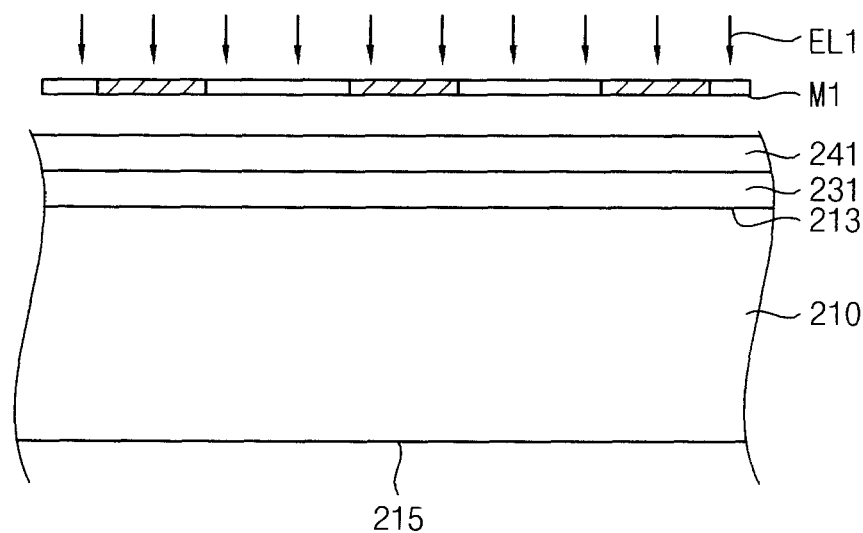
FIGS. 7A to 7D are cross-sectional views illustrating an exemplary embodiment of a manufacturing process of the light guide unit of FIG. 4.
Figure 7B:
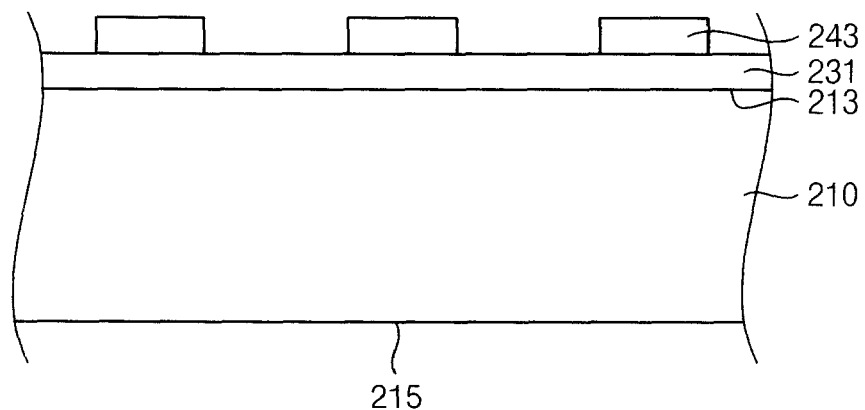

A polymer layer 231, for example, that is identical as a material of the LGP 210, is formed on an upper surface 213 of the LGP 210, as shown in FIG. 7A. A photoresist film 241 is formed on the polymer layer 231. The photoresist film 241 is exposed, such as by using a mask M1 in which a pattern is formed in correspondence with the light-exiting protrusions 230. The exposed photoresist film 241 is developed, such as using light ELI, to form a photoresist pattern 243 as shown in FIG. 7B. The polymer layer 231 is etched by using the photoresist pattern 243 as an etching mask, as shown in FIG. 7C.

Figure 7C:
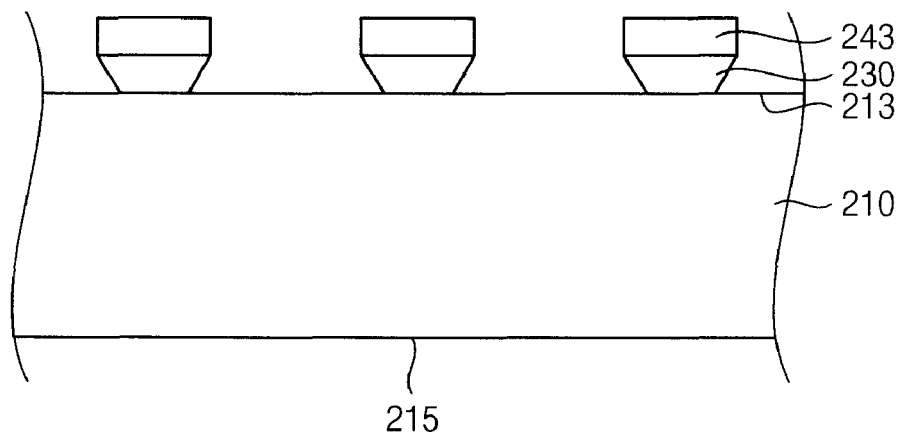
Figure 7D:
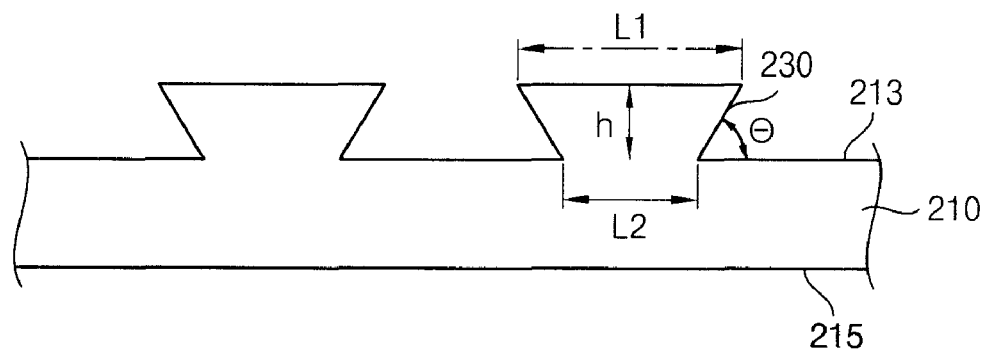

An etching process in which an etching amount increases toward an area of the upper surface 213 of the LGP 210 is designed to form the light-exiting protrusions 230 of an inverted conical shape as shown in FIG. 7C. The photoresist pattern 243 is removed to complete the light guide unit 201 as shown in FIG. 7D.

In an exemplary embodiment, a width L1 of the upper (distal) surface of the light-exiting protrusion 230 may be about 10 micrometers (μm) to about 25 μm. A width L2 of the lower surface of the light-exiting protrusion 230 may be about 5 μm to about 15 μm. A height h of the light-exiting protrusion 230 may be about 10 μm to about 15 μm, taken from the upper surface 213 of the LGP 210 to the upper (distal) surface of the light-exiting protrusion. An angle θ between a side surface of the light-exiting protrusion 230 and the upper surface 213 of the LGP 213 may be about 60 degrees to about 80 degrees.

The display device 200 may further include a receiving container 205 (FIG. 1) which receives the display panel 100, the light source 250, the reflective sheet 207 and the light guide unit 201.

According to the illustrated embodiment, as described above, a light-reflecting layer for recycling light is omitted from the display panel 100. Therefore, in contrast to the light reflecting efficiency of the light-reflecting layer, light luminance variation may be reduced or effectively prevented from being generated, and the luminance uniformity of light incident to the light control area PA01 may be enhanced.

Figure 8:
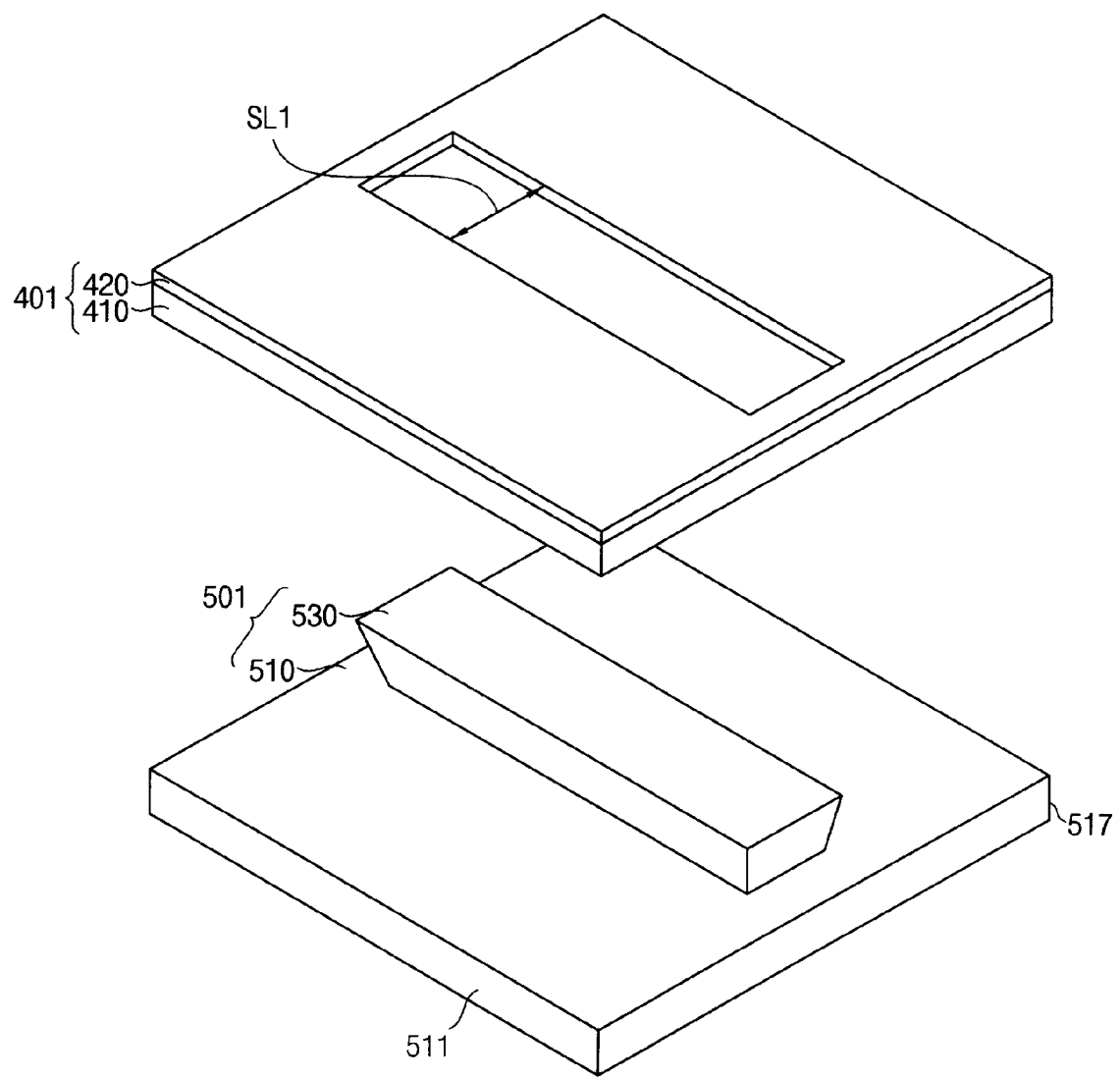
FIG. 8 is a perspective view illustrating another exemplary embodiment of a display device according to the invention.

FIG. 8 is a perspective view illustrating another exemplary embodiment of a display device.

Referring to FIG. 8, a light guide unit 501 and the display device of the illustrated embodiment are substantially the same as the light guide unit 201 and the display device 200 described with reference to FIGS. 1 to 7, except for the shape of a light-exiting protrusion 530. Thus, identical reference numerals are used in FIG. 8 to refer to components that are the same or like those shown in FIGS. 1 to 7, and thus, a detailed description thereof will be omitted.

In the illustrated embodiment, the light-exiting protrusion 530 has a substantially rectangular bar or slit shape longitudinally extended in a length direction of the first slit SL1 disposed extended through a light-blocking layer 420 disposed on a lower substrate 410 of a first substrate 401. A cross-section of the light-exiting protrusion 530 has an inverted conical shape. The light-exiting protrusion 530 may correspond to and be aligned with the first slit SL1 in a one-to-one correspondence. Alternatively, a plurality of the light-exiting protrusion 530 may correspond to a single one the first slit SL1.

The light-exiting protrusion 530 includes a first surface coplanar with an upper surface of the LGP 510, and a second (distal) surface disposed facing and parallel with the first surface. A planar area of the first surface is smaller than a planar area of the second surface. Sides of the light-exiting protrusion 530 disposed between and connecting the first and second surfaces to each other, are inclined with respect to the upper surface of the LGP 510. A dimension in the length direction of the light-exiting protrusion 530 is larger than a width direction of the light-exiting protrusion 530 taken perpendicular to the length direction, and the light-exiting protrusion 530 is considered to have a substantially bar shape.

An extending direction of the light-exiting protrusion 530 from an upper surface of a LGP 510 may be in parallel with a light-entering surface 511 of the LGP 510. The light fully reflected in the interior of the LGP 510 may be transmitted from the light-entering surface 511 toward an opposite surface 517, so that the light-exiting efficiency may be enhanced when the light-exiting protrusion 530 has the slit shape as described above.

Figure 9:
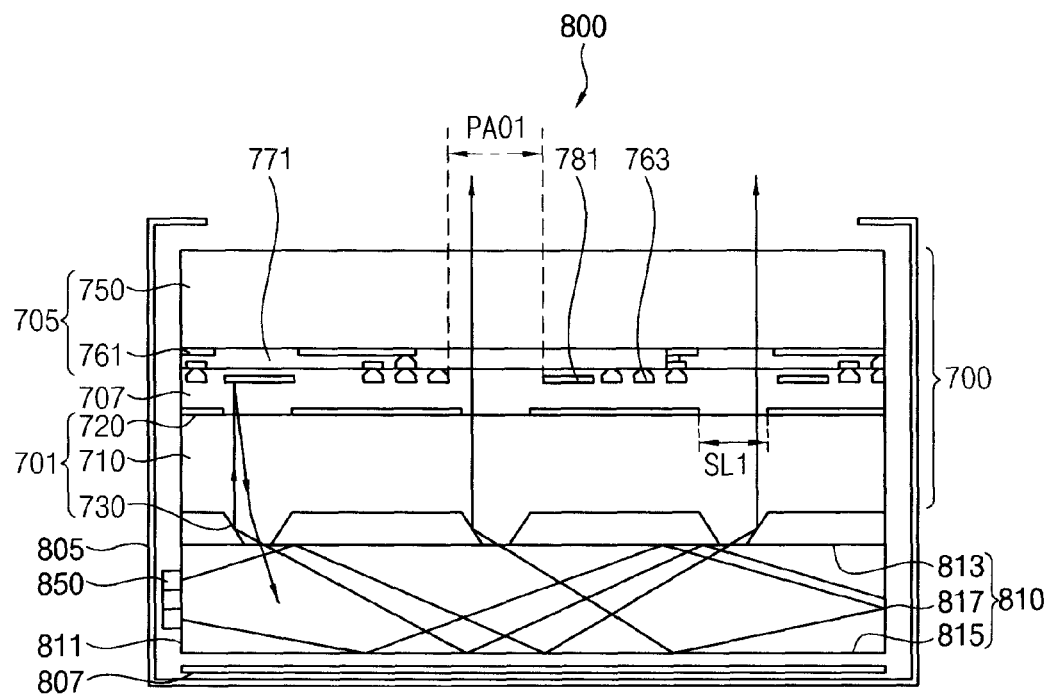
FIG. 9 is a cross-sectional view illustrating another exemplary embodiment of a display device according to the invention.

FIG. 9 is a cross-sectional view illustrating another exemplary embodiment of a display device 800.

Referring to FIG. 9, the display device 800 of the illustrated embodiment is substantially the same as the display device 200 described with reference to FIGS. 1 to 7, except for that a light-exiting protrusion 730 is disposed extending from a lower surface of a lower substrate 710, and not disposed extending from a LGP 810. Thus, identical reference numerals are used in FIG. 9 to refer to components that are the same or like those shown in FIGS. 1 to 7, and thus, a detailed description thereof will be omitted.

The display device 800 of the illustrated embodiment includes a display panel 700, the LGP 810 and a plurality of the light-exiting protrusion 730. The display panel 700 includes a first substrate 701, a second substrate 705, an insulation fluid 707, a reflective sheet 807 and a receiving container 805. The first substrate 701 includes a light-blocking layer 720 disposed on an upper surface of the lower substrate 710. A plurality of a first slit SL1 is disposed extended completely through the light-blocking layer 720. The second substrate 705 may include an upper substrate 750, a switching element 761, a second insulation layer 771 and a MEMS shutter 781. Two of a control electrode 763 may be disposed on the second insulation layer 771 to face each other in a plan view of the second substrate 705, in accordance with an edge portion of the light control area PA01.

The LGP 810 is disposed below the first substrate 701 opposing a viewing side of the display device 800. The LGP 810 ha a plate shape and includes a light-entering surface 81, an upper surface 813 connected to the light-entering surface 811, a lower surface 815 connected to the light-entering surface 811 to face the upper surface 813, and an opposite surface 817 facing the light-entering surface 811. A light source 850 is disposed facing the light-entering surface 811.

The light-exiting protrusion 730 is disposed extended from a lower surface of the lower substrate 710, and in correspondence with (e.g., aligned with) the first slit SL1. The lower substrate 710 including the light-exiting protrusions 730 may be a single unitary indivisible member, as shown in FIG. 9. In an exemplary embodiment of a process of manufacturing the light-exiting protrusions 730, a polymer layer identical to or similar to the LGP 810, is disposed on the lower surface of the lower substrate 710, and the polymer layer is patterned through a photolithography process as described with reference to FIGS. 7A to 7D, to form the light-exiting protrusion 730.

In the illustrated embodiment, the light-exiting protrusion 730 is formed to have a decreased cross-section in a direction away from the lower surface of the lower substrate 710 and towards the LGP 810. Thus, the light-exiting protrusion 730 has a conical shape. An upper (distal) end portion of the light-exiting protrusion 730 contacts the upper surface 813 of the LGP 810.

According to the illustrated embodiment, since the light-exiting protrusions 730 are disposed extending from the lower substrate 710, and not disposed extending from the LGP 810, the light-exiting protrusions 730 may be arranged to correspond to and be aligned with the first slit SL1 of the light blocking layer 720.

Figure 10:
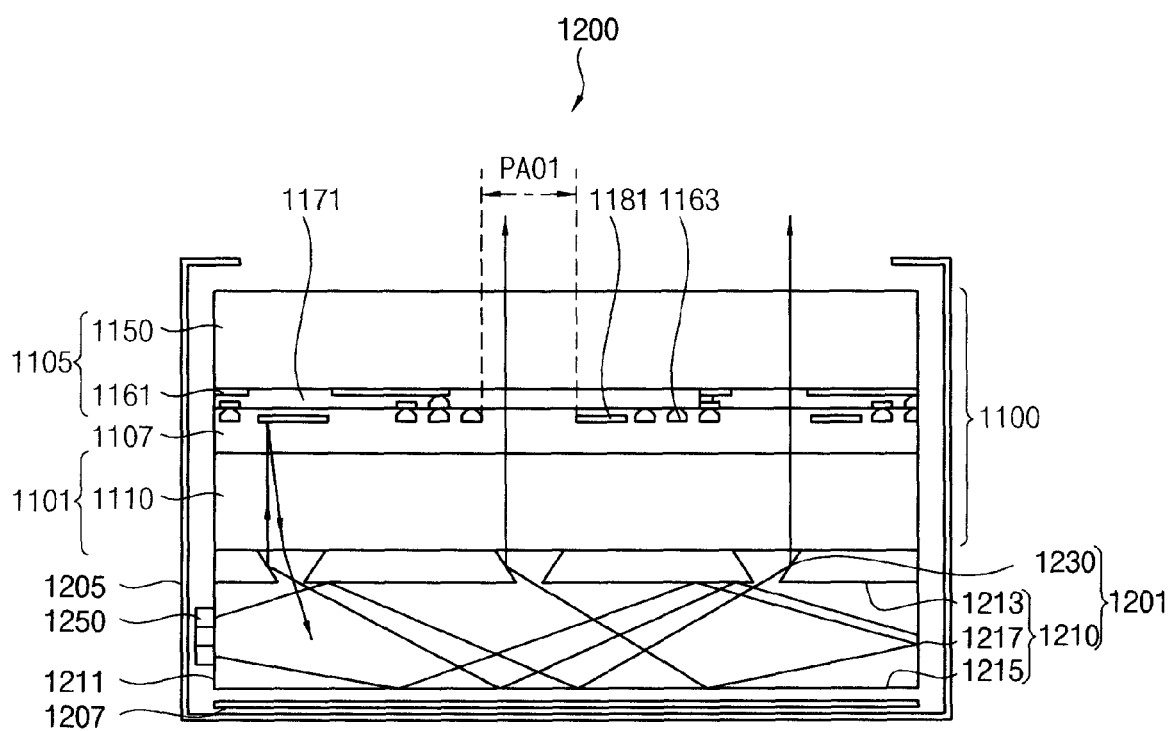
FIG. 10 is a cross-sectional view illustrating another exemplary embodiment of a display device according to the invention.

FIG. 10 is a cross-sectional view illustrating another exemplary embodiment of a display device 1200.

Referring to FIG. 10, a light guide unit 1201 of the illustrated embodiment is substantially the same as the light guide unit 201 described with reference to FIGS. 1 to 7. The display device 1200 of the illustrated embodiment is substantially the same as the display device 200 described with reference to FIGS. 1 to 7, except that the light-blocking layer is removed from a first substrate 1101 and a shape of MEMS shutter 1181 is varied in a second substrate 1105. Thus, identical reference numerals are used in FIG. 10 to refer to components that are the same or like those shown in FIGS. 1 to 7, and thus, a detailed description thereof will be omitted.

The display device 1200 of the illustrated embodiment includes the display panel 1100, an LGP 1210 and the plurality of the light-exiting protrusion 1230. The display panel 1100 includes the first substrate 1101, the second substrate 1105, an insulation fluid 1107, a reflective sheet 1207 and a receiving container 1205. The first substrate 1101 includes a lower substrate 1110. The second substrate 1105 may include an upper substrate 1150, a switching element 1161, a second insulation layer 1171 and the MEMS shutter 1181. Two of a control electrode 1163 may be disposed on the second insulation layer 1171 to face each other in a plan view of the second substrate 1105, in accordance with an edge portion of the light control area PA01.

The LGP 1210 is disposed below the first substrate 1101 opposing a viewing side of the display device 1200. The LGP 1210 ha a plate shape and includes a light-entering surface 1211, an upper surface 1213 connected to the light-entering surface 1211, a lower surface 1215 connected to the light-entering surface 1211 to face the upper surface 1213, and an opposite surface 1217 facing the light-entering surface 1211. A light source 1250 is disposed facing the light-entering surface 1211.

In a display panel 1100 of the illustrated embodiment, a light-blocking layer is omitted from the first substrate 1101. Thus, the structure of the display device 1200 of the illustrated embodiment may be simplified, and a manufacturing process thereof may be shortened. In the illustrated embodiment, a plurality of a light-exiting protrusion 1230 is arranged to correspond to and align with a light-control area PA01 of the second substrate 1105.

The MEMS shutter 1181 may be disposed in a flat plate shape through which an opening portion is not disposed. Thus, the MEMS shutter 1181 is disposed in a peripheral area to open the light control area PA01 when a switching element 1161 is turned on, and the DMS 1181 blocks the light control area PA01 when the switching element 1161 is turned off.

Figure 11:
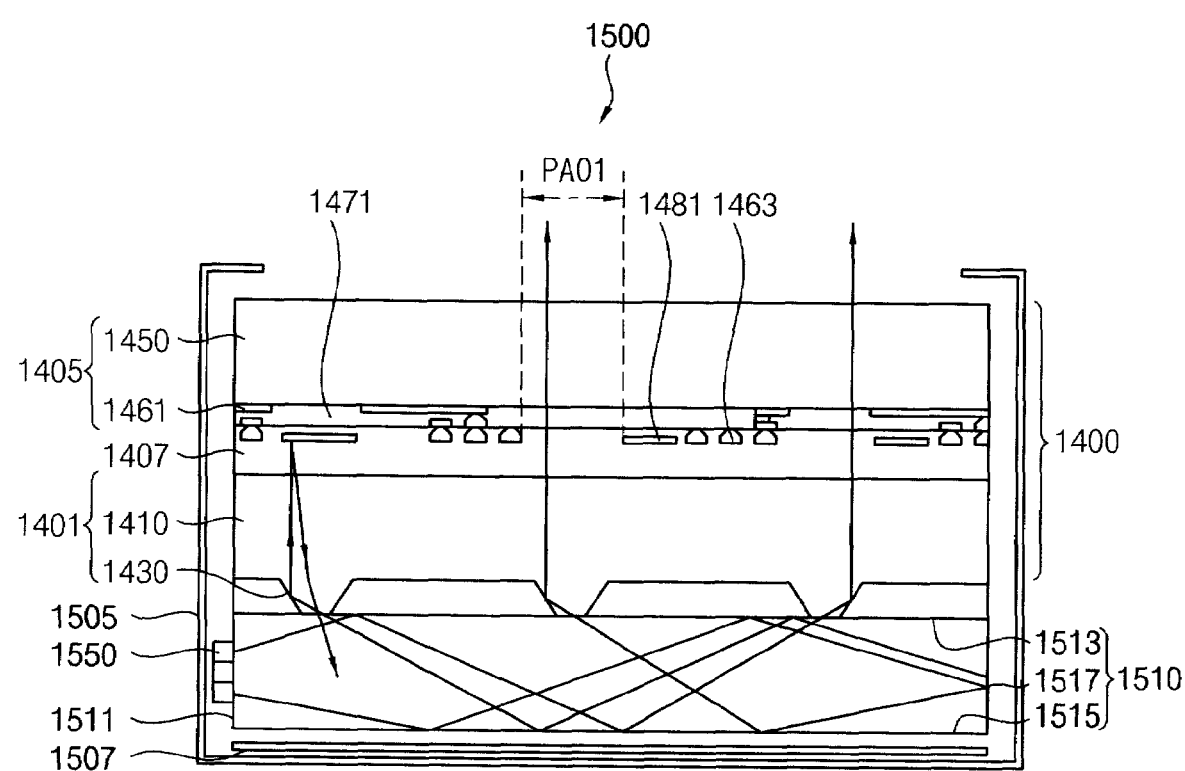
FIG. 11 is a cross-sectional view illustrating another exemplary embodiment of a display device according to the invention.

FIG. 11 is a cross-sectional view illustrating another exemplary embodiment of a display device 1500.

Referring to FIG. 11, the display device 1500 of the illustrated embodiment is substantially the same as the display device 800 described with reference to FIG. 9, except for that the light-blocking layer is removed from a first substrate 1401. Thus, identical reference numerals are used in FIG. 11 to refer to components that are the same or like those shown in FIG. 9, and thus, a detailed description thereof will be omitted.

The display device 1500 of the illustrated embodiment includes a display panel 1400, an LGP 1510 and a plurality of a light-exiting protrusion 1430. The display panel 1400 includes the first substrate 1401, a second substrate 1405, an insulation fluid 1407, a reflective sheet 1507 and a receiving container 1505. The second substrate 1405 may include an upper substrate 1450, a switching element 1461, a second insulation layer 1471 and a MEMS shutter 1481. Two of a control electrode 1463 may be disposed on the second insulation layer 1471 to face each other in a plan view of the second substrate 1405, in accordance with an edge portion of the light control area PA01.

The LGP 1510 is disposed below the first substrate 1401 opposing a viewing side of the display device 1500. The LGP 1510 ha a plate shape and includes a light-entering surface 1511, an upper surface 1513 connected to the light-entering surface 1511, a lower surface 1515 connected to the light-entering surface 1511 to face the upper surface 1513, and an opposite surface 1517 facing the light-entering surface 1511. A light source 1550 is disposed facing the light-entering surface 1511.

In the display panel 1400 of the illustrated embodiment, a light-blocking layer is omitted from the first substrate 1401. Moreover, light-exiting protrusions 1430 are arranged on a lower surface of a second substrate 1410. In the illustrated embodiment, the light-exiting protrusions 1430 are arranged to correspond to and align with the light control area PA01 of a second substrate 1405.

The MEMS shutter 1481 may be disposed in a flat plate shape through which an opening portion is not disposed. Thus, the MEMS shutter 1481 is disposed in a peripheral area to open the light control area PA01 when a switching element 1461 is turned on, and the MEMS shutter 1481 blocks the light control area PA01 when the switching element 1461 is turned off.

Therefore, the structure of the display device 1500 may be simplified, and a manufacturing process thereof may be shortened. Moreover, since the light-exiting protrusions 1430 are disposed extending from the lower substrate 1410, and not disposed extending from the LGP 1510, the light-exiting protrusions 1430 may be arranged to correspond to and align with the first slit SL1.

According to the illustrated embodiment, the structure of a display device may be simplified and light-use efficiency may be enhanced, so that the display quality of the display device may be enhanced. Thus, the structure and light-use efficiency of the display device having a microelectromechanical system ("MEMS") element may be enhanced. Therefore, the invention may be employed to a light control device having the MEMS element.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A light guide unit comprising:
  a light guide plate comprising a light-entering surface, an upper surface connected to the light-entering surface and a lower surface facing the upper surface; and
  a plurality of a light-exiting protrusion protruding from the upper surface of the light guide plate to have a cylindrical shape in which a cross-section size of a light-exiting protrusion increases in a direction away from the upper surface of the light guide plate, wherein the light-exiting protrusions are disposed aligned with a light control area which is turned on or off by a microelectromechanical system shutter, and light guided by the light guide unit to the light control area exits through the light-exiting protrusions.

2. The light guide unit of claim 1, wherein the light-exiting protrusions each have an inverted conical shape.

3. The light guide unit of claim 1, wherein the light-exiting protrusions each have a bar shape and are disposed aligned with an opening of a slit shape disposed in the microelectromechanical system shutter.

4. A display device comprising:
a display panel comprising a first substrate and a second substrate, the second substrate comprising:
an upper substrate facing the first substrate;
a light control area defined at a lower surface of the upper substrate;
a switching element disposed between the upper substrate and the first substrate; and
a microelectromechanical system shutter moveable in a direction parallel with the lower surface of the upper substrate in response to the switching element, wherein the movable microelectromechanical system shutter turns on the light control area or turns off the light control area;
a light guide plate facing a lower surface of the first substrate; and
a plurality of a light-exiting protrusion being disposed between the lower surface of the first substrate and an upper surface of the light guide plate, and disposed aligned with the light control area, the light guided by the light guide plate exits the light-exiting protrusions and is transmitted toward the light control area.

5. The display device of claim 4, wherein the light-exiting protrusions are protruded from the upper surface of the light guide plate such the light guide plate is a single unitary indivisible member including the light-exiting protrusions.

6. The display device of claim 5, wherein the first substrate comprises:
a lower substrate facing the upper substrate; and
a light-blocking layer disposed between an upper surface of the lower substrate and the second substrate to block light, and including a plurality of a first slit, each of which transmits the light by a unit area aligned with the light control area.

7. The display device of claim 6, wherein a plurality of a second slit is disposed extending through the microelectromechanical system shutter, and aligned with the first slits when the light control area is turned on.

8. The display device of claim 7, wherein a planar area of the first slit is about 95% to about 98% of a planar area of the second slit.

9. The display device of claim 6, wherein the light-exiting protrusions have a cylindrical shape in which a cross-section size thereof increases in a direction away from the light guide plate, and the plurality of the light-exiting protrusions are disposed aligned with one of the first slits.

10. The display device of claim 9, wherein the light-exiting protrusion has an inverted conical shape.

11. The display device of claim 9, wherein the light-exiting protrusion has a bar shape longitudinally extended in a length direction of the first slit.

12. The display device of claim 5, wherein the light-exiting protrusion comprises polymer.

13. The display device of claim 4, wherein the light-exiting protrusions are disposed adjacent to the lower surface of the first substrate.

14. The display device of claim 13, wherein the first substrate comprises:
a lower substrate facing the upper substrate, the light-exiting protrusions disposed between a lower surface of the lower substrate and the light guide plate; and
a light-blocking layer disposed on an upper surface of the lower substrate to block light, and including a plurality of first slits, which transmit light by a unit area aligned with the light control area.

15. The display device of claim 14, wherein the light-blocking layer comprises a black chrome layer.

16. The display device of claim 14, wherein light-exiting protrusion has a cylindrical shape in which a cross-section size thereof decreases in a direction away from a lower surface of the first substrate, and the light-exiting protrusions are disposed aligned with one of the first slits.

17. The display device of claim 13, wherein the light-exiting protrusion comprises a same polymer as the light guide plate.

18. The display device of claim 4, further comprising a light source disposed facing a side surface of the light guide plate.

19. The display device of claim 4, wherein the display panel further comprises an insulation fluid disposed between the first substrate and the second substrate.

20. The display device of claim 4, wherein the light guided by the light guide plate is fully reflected between an upper surface and a lower surface of the light guide plate, except for areas of the upper surface where the light-exiting protrusions are disposed.

* * * * *